(No Model.) 2 Sheets—Sheet 1.
E. LOZE & A. HELAERS.
FILTER.
No. 319,917. Patented June 9, 1885.
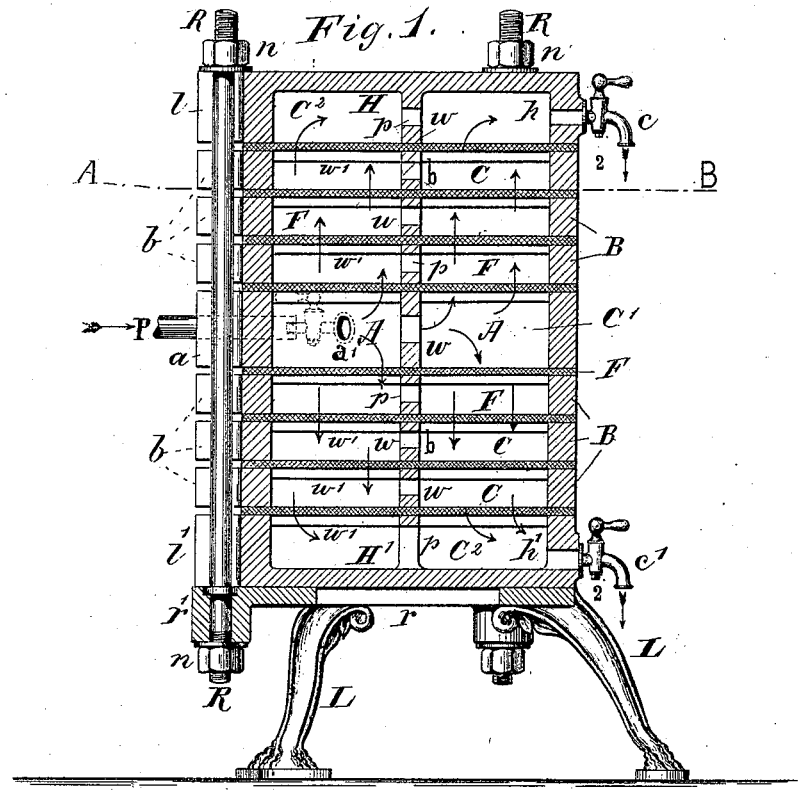
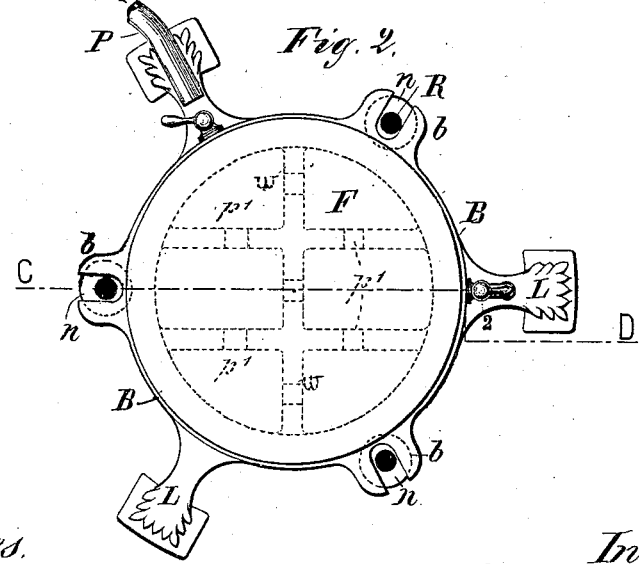
Witnesses.
Inventors.
Eugène Loze
Alphonse Helaers
by Henry Orth
their atty.

(No Model.) 2 Sheets—Sheet 2.
E. LOZE & A. HELAERS.
FILTER.
No. 319,917. Patented June 9, 1885.
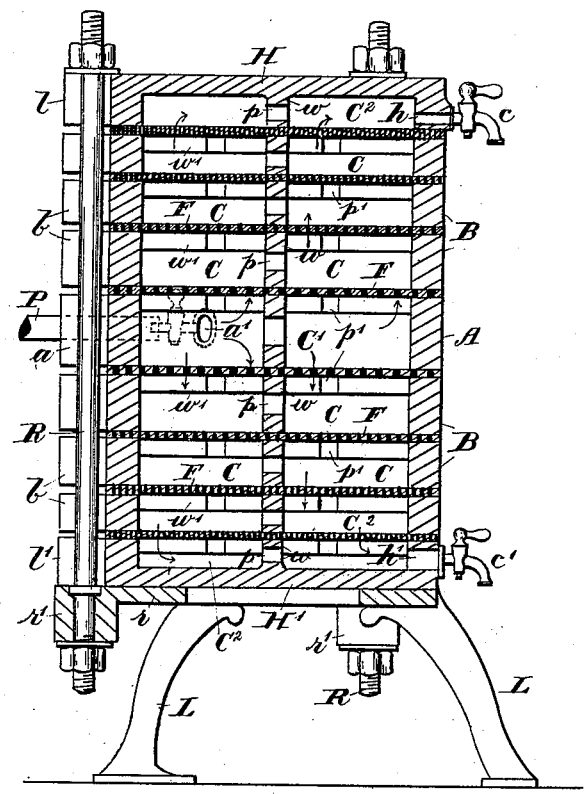
Fig. 3.
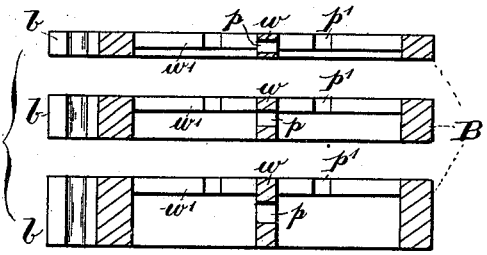
Fig. 4.
Fig. 5.
Witnesses:
Inventors:
Eugène Loze,
Alphonse Helaers,
per Henry Orth
their atty.

UNITED STATES PATENT OFFICE.

EUGÉNE LOZE AND ALPHONSE HELAERS, OF FLEURUS, BELGIUM.

FILTER.

SPECIFICATION forming part of Letters Patent No. 319,917, dated June 9, 1885.

Application filed March 16, 1885. (No model.) Patented in Belgium April 17, 1883, No. 61,130; in France May 19, 1883, No. 455,549, and in Austria January 31, 1884, No. 43,814.

*To all whom it may concern:*

Be it known that we, EUGÉNE LOZE and ALPHONSE HELAERS, citizens of the Kingdom of Belgium, residing at Fleurus, in Belgium, have invented certain new and useful Improvements in Filter Apparatus, (for which we have obtained Letters Patent in Belgium, No. 61,130, dated April 17, 1883; in France, No. 155,549, dated May 19, 1883, and in Austria, No. 43,814, dated January 31, 1884;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of our invention is to produce an apparatus for filtering fluids by means of which the process of filtration may be carried out more rapidly than can be done in apparatus of this class of usual construction.

The further object of the invention is to produce a knockdown filter capable of being readily taken to pieces for purposes of cleaning by constructing the same of sections adapted to be united together; and, lastly, the invention has for its object to construct the sectional filter with a view to varying its capacity as a filter, as well as that of its component filtering-chambers, so as to adapt the filter to the volume or the nature of the fluid to be filtered, or both.

The invention consists in the construction of the filter and the combination of its parts, substantially as hereinafter fully described, and as shown in the accompanying drawings, in which—

Figure 1 is a vertical transverse section, and Fig. 2 a horizontal section, of a filter constructed according to our invention. Fig. 3 is a view similar to Fig. 1, showing the filtering-chambers of the apparatus decreasing in depth from the central or receiving chamber upward and downward. Fig. 4 shows by detached sectional views several filter-sections of varying depth, and Fig. 5 shows by like views filtering media of different degrees of fineness.

In the drawings we have selected as an illustration of our invention a cylindrical filter, though from the description given hereinafter it will be readily comprehended that this form is not essential to its good operation, and we do therefore not desire to limit ourselves thereto, as the filter may be made square, hexagonal, octagonal, or of other form in cross-section.

The filter is constructed as follows: H and H' are the cylindrical heads, in which are formed the discharge-orifices $h$ and $h'$, respectively, from which and the valves or stop-cocks $c$ and $c'$ the fluid, after having traversed the filtering media, is discharged. The heads are provided with three or more slotted lugs, $l$ and $l'$, respectively, that project from the periphery thereof for the reception and passage of the rods R. A central cylindrical section, A, preferably of greater depth or vertical extent than the remaining sections, or most of them, is provided with the inlet-orifice $a'$, to which is connected the valved feed-pipe P, said section being, like the heads, provided with slotted lugs $a$, for the reception and passage of said tie-rods R. Those portions of the filter intermediate of the two heads H and H' and the central section, A, may be composed of any number of cylindrical sections B, either of the same depth or of different depths, all of said sections having lugs $b$ for the reception and passage of the tie-rods R. The heads H H', the central section, A, and the intermediate sections, B, are all provided with a central transverse partition or web, $w$, in which are formed ports or passages $p$, for the circulation of the fluid, and with the exception of the head H, with one or more transverse partitions or webs, $w'$, at right angles to the web $w$, in which are also formed ports or passages $p'$ for the circulation of the fluid. These partitions or webs $w$ and $w'$, as more plainly shown in dotted lines in Fig. 2, form gratings for the support of the filtering media F, which is thus or may be clamped or secured between said gratings and the annular rim of the sections and then assembled fluid-tight by means of the tie-rods R. Instead of arranging the partitions or webs $w$ and w' at right angles to each other, they may be arranged parallel with each other, and answer the same purpose.

The filter thus constructed may be supported from a stand or base composed of a base-ring, r, to which legs L are secured, or on which such legs are formed, said ring being provided with tubular bosses r', through which the rods R pass. The rods are screw-threaded at both ends and receive the tightening-nuts n, by means of which the sections of the filter are united and clamped together and to the filtering media fluid-tight.

According to the nature of the fluid to be filtered, it may be found desirable either to have all the filtering-chambers C of the same area, or to gradually increase the area of the chambers from the central receiving-chamber, C', to the discharging-chambers C², formed by the heads H H'; or it may be found desirable to vary the area of the filtering-chambers C inversely or alternately. Again, it may be found desirable either to increase or decrease the number of filtering-chambers C, all of which can be readily effected by the interchangeable sections B, as will be readily understood.

The variation in the area of the filtering-chambers may also be attained by dispensing with some of the filtering media and inserting a suitable gasket or packer between those sections from which the filtering media has been removed. The filtering media may also be of different densities—i. e., of different degrees of fineness—either increasing from the receiving-chamber to the heads, or vice versa, or alternately.

In Fig. 3 we have shown a filter in which the area of the filtering-chambers decreases from the central or receiving chamber, C', to the discharging-chambers C² C². In Fig. 4 we show several of the interchangeable filter-sections by means of which the area of the filtering-chambers may be varied, and in Fig. 5 we show a series of filtering media of different degrees of fineness by means of which the filtering capacity may be varied.

In this manner we produce a filter which is not only adapted to be readily taken apart for the purpose of cleaning the filtering media and the filter-casing, but which is adapted for use for filtering purposes generally. By dividing the inflowing current of the fluid and causing it to flow or pass through the filtering media in opposite directions, the filtration is effected more rapidly than when the fluid is caused to flow in one direction only.

Finally, we would remark that the filter need not necessarily be placed in a vertical position, as it may be placed with its longer axis horizontal or at any angle between a horizontal and vertical line, according to circumstances.

Having now described our invention, what we claim is—

1. A knockdown filter composed of the head-sections H and H' provided with discharge-orifices, a central section, A, provided with an inlet-orifice, and sections B, arranged between said central and head sections, in combination with filtering media adapted to be clamped between the sections of the filter to form a central receiving-chamber, C, filtering-chambers C', and discharge-chambers C², and tie-rods R, common to all the sections for connecting the same together and clamping the filtering media between them, substantially as and for the purpose specified.

2. A knockdown filter composed of two end sections or heads having each a discharge-orifice, an intermediate section having the inlet-orifice, and interchangeable sections of varying depth adapted to be interposed between said end sections and intermediate sections, in combination with tie-rods for uniting said sections together, as described, for the purpose specified.

In testimony whereof we affix our signatures in presence of two witnesses.

EUGÉNE LOZE.
ALPHONSE HELAERS.

Witnesses:
HENRY RACLOK,
E. LABASQUE.